United States Patent

Frank

[11] Patent Number: 4,517,618
[45] Date of Patent: May 14, 1985

[54] PROTECTION CIRCUITRY FOR HIGH VOLTAGE DRIVERS

[75] Inventor: G. Haven Frank, Baltimore, Md.

[73] Assignee: The United States of America as represented by the Secretary of the Air Force, Washington, D.C.

[21] Appl. No.: 529,412

[22] Filed: Sep. 6, 1983

[51] Int. Cl.³ .............................................. H02H 3/24
[52] U.S. Cl. .................................... 361/58; 323/285; 361/79
[58] Field of Search .................... 361/58, 65, 92, 78, 361/79; 323/285, 288, 293

[56] References Cited

U.S. PATENT DOCUMENTS

| | | |
|---|---|---|
| 3,558,982 | 1/1971 | Greenwood . |
| 3,725,678 | 4/1973 | Reddy ............................ 323/285 X |
| 3,731,150 | 5/1973 | Weiser . |
| 3,748,569 | 7/1973 | Frank et al. .......................... 323/9 |
| 3,935,511 | 1/1976 | Boulanger et al. . |
| 3,959,714 | 5/1976 | Mihelich ............................ 323/288 |
| 4,034,268 | 7/1977 | Klauck ................................ 361/111 |
| 4,208,708 | 6/1980 | Abraham et al. ..................... 363/57 |
| 4,245,270 | 1/1981 | Busby .................................. 361/58 |

Primary Examiner—Harry E. Moose, Jr.
Attorney, Agent, or Firm—Donald J. Singer; Richard J. Donahue

[57] ABSTRACT

Protection circuitry interposed between a power source and a load is arranged to gradually apply high voltage to the load until the voltage has attained a predetermined percentage of its nominal value. In the event that the load current exceeds a prescribed maximum limit, or in the absence of additional load voltages, the high voltage supply is disconnected from the load.

5 Claims, 2 Drawing Figures

PROTECTION CIRCUITRY FOR HIGH VOLTAGE DRIVERS

STATEMENT OF GOVERNMENT INTEREST

The invention described herein may be manufactured and used by or for the Government for governmental purposes without the payment of any royalty thereon.

BACKGROUND OF THE INVENTION

The present invention concerns protection circuitry for semiconductor high voltage drivers and the like, and particularly to circuitry for protecting such load devices from power transients which occur during the system turn-on interval as well as from abnormal power conditions which may occur during system operation.

In many high voltage driver circuits, including those using PIN diodes operating at voltages in the order of one hundred to several hundred volts, the power supply interface is extremely important in determining overall circuit performance and reliability. A circuit designer can maximize driver speed and operating efficiency if means are provided to protect the driver devices from the sudden, uncontrolled application of high voltages thereto during the power turn-on interval and from other power source abnormalities, such as the absense or sudden loss of one or more additional voltages required by the load circuitry. It is also highly desireable that such protection means have the capability of accurately controlling the turn-on voltage risetime and the maximum value of the current applied to the driver circuitry.

Accordingly, it is the objective of this invention to provide simple and reliable protection circuitry for accomplishing these ends.

SUMMARY OF THE INVENTION

In accordance with the present invention, a protection circuit includes an integral RC filter interposed between a power source and a load which, in addition to providing supply voltage smoothing, slows the risetime of the high voltage to the load during the turn-on interval. Additionally, the protection circuit includes an accurate and adjustable current limiter having prescribed hysteresis and frequency compensation characteristics. Low voltage supply values are monitored and the high voltage is not applied to the load until all low voltages are present and have reached a predetermined minimum value. Should a low voltage disappear, the high voltage supply is automatically disconnected from the load.

For a better understanding of the invention, together with other objects thereof, reference is made to the following description taken in conjunction with the accompanying drawings, and its scope will be pointed out in the appended claims.

DETAILED DESCRIPTION OF THE DRAWINGS

Figure 1:
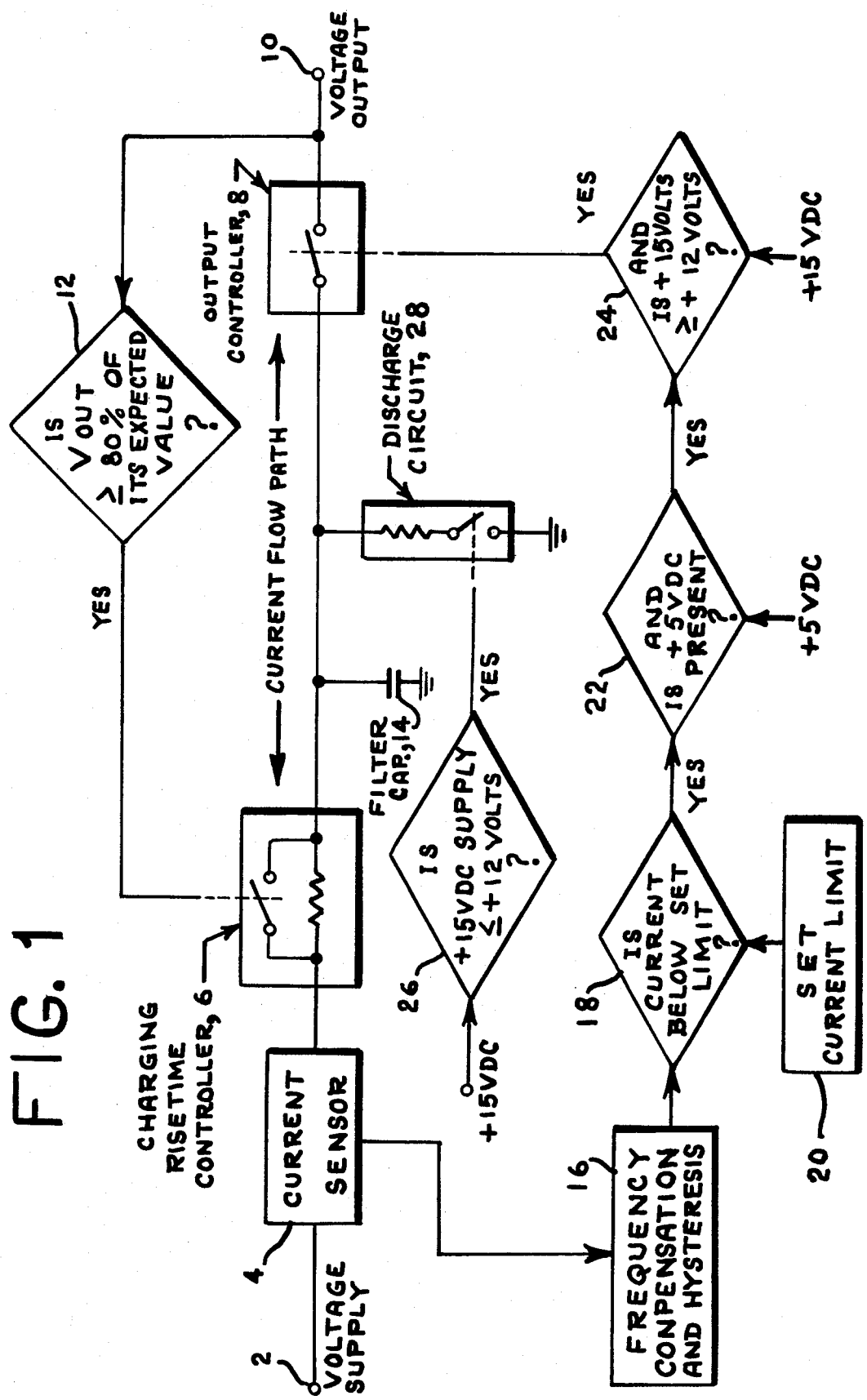
Figure 2:
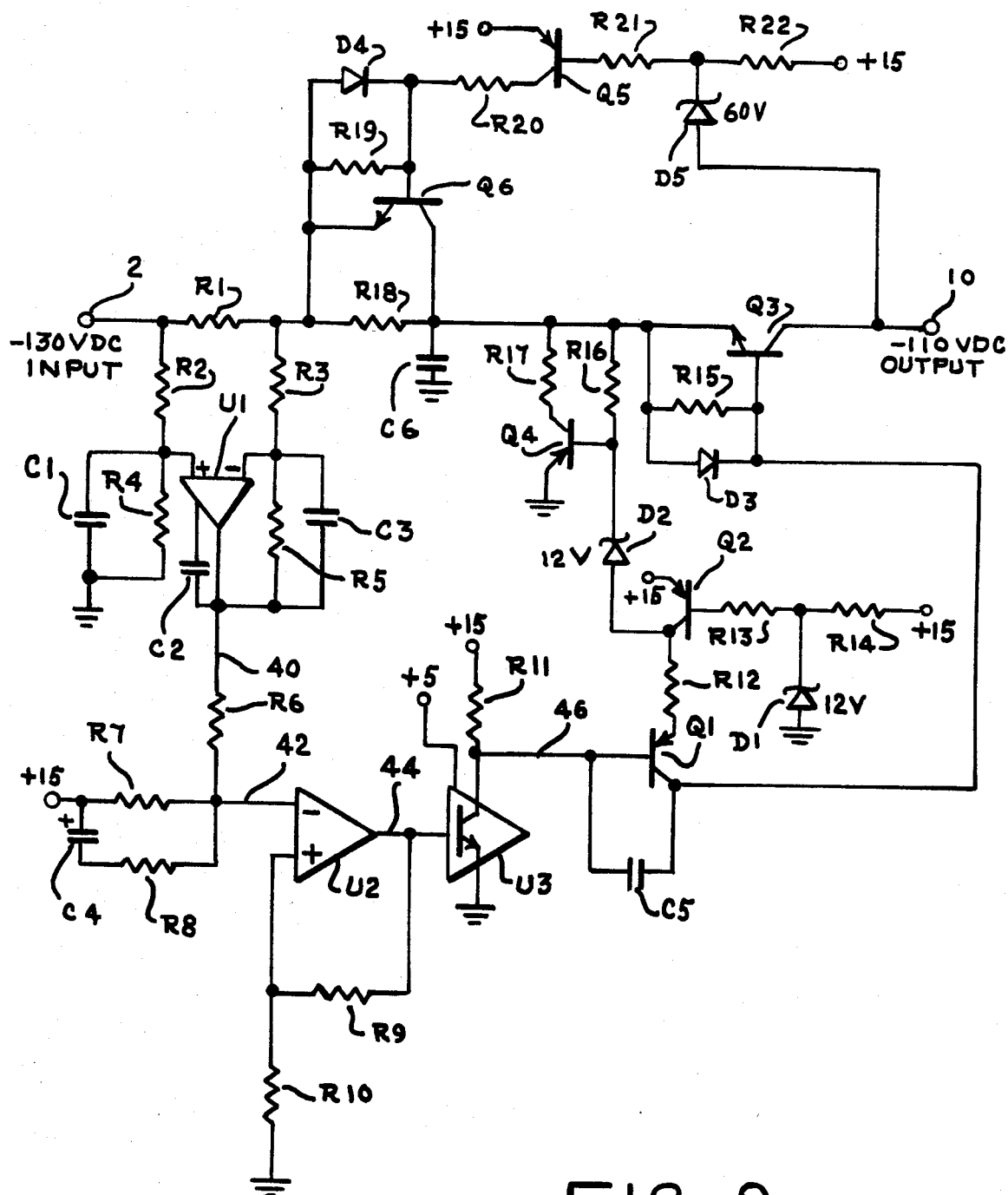

FIG. 1 is a functional block diagram of the protection circuit of the present invention; and FIG. 2 is a circuit diagram of the preferred embodiment of the present invention.

DESCRIPTION OF THE PREFERRED EMBODIMENT

Referring now to the functional block diagram of the invention illustrated in FIG. 1, the current path for the high voltage supply is shown in the center of the figure where it flows from a voltage supply terminal 2, through a current sensor 4, a charging risetime controller 6, an output controller 8 to a voltage output terminal 10. As mentioned above the output voltage on terminal 10 is subsequently applied to load devices, such as PIN diodes, which are subject to failure from voltage transients and other power supply abnormalities. The additional flow paths shown in the function block diagram perform control and sensing functions which are discussed below.

It will be assumed, for the moment, that the current required by the load connected to terminal 10 is within a prescribed maximum valve and that the low level supply voltages are present. In this situation, output controller 8 is activated such that the high voltage supply is coupled therethrough to the voltage output terminal 10. This voltage will increase exponentially as filter capacitor 14 is charged through the impedance presented by charging risetime controller 6. Output voltage sensor 12 senses the magnitude of the voltage at terminal 10. When this voltage reaches eighty percent of its normal value, the series impedance presented by charging risetime controller 6 is shunted and the output voltage increases rapidly to its full value.

Current sensor 4, in series with the current flow path, senses current to the load and provides an indication thereof to frequency compensation and hysterisis circuitry 16. This load current is compared in block 18 with a preset maximum value established by block 20. If the load current is below a prescribed high limit, a logic signal to this effect is coupled to gate circuit 22, which checks for the simultaneous presence of a first low level supply voltage of 5 volts. If the 5 volts is present, a logic signal to this effect is applied to gating circuit 24, which assures that a second low voltage supply of 15 volts has attained a value of at least 12 volts, i.e., eighty percent of its nominal or expected value. If it has, then output controller 8 is activated, as assumed earlier. If however, the load current exceeds the prescribed limit, or the 5 volt supply is not present, or the 15 volt supply drops below 12 volts, then output controller 8 disconnects the high voltage from output voltage terminal 10 to protect the load devices. In instances where the 15 volt supply falls below 12 volts, as noted in block 26, a discharge circuit 28 is established across filter capacitor 14 to discharge the latter.

The foregoing functional arrangement of the present invention has been implemented in accordance with the circuit diagram of FIG. 2. Typical values for the circuit components are given in Table I below.

TABLE I

| | | | |
|---|---|---|---|
| R1 | 40.2Ω | C1,3 | 1000 pF |
| R2,3,7, | 100 KΩ | C2 | 30 pF |
| R4,5,6,8 | 10 KΩ | C4 | 4.7 μF |
| R9 | 75 KΩ | C5 | .01 μF |
| R10 | 8.66 KΩ | C6 | 100 μF |
| R11,16,21 | 20 KΩ | | |
| R12,13,18 | 1 KΩ | U1,2 | LM 101A |
| R14 | 220Ω | U3 | DM 5401 |
| R15,19 | 510Ω | | |
| R17 | 200Ω | Q1,4,5 | 2N4930 |
| R20 | 15 KΩ | Q2 | 2N2905A |
| R22 | 25 KΩ | Q3 | 2N3584 |
| D1,2 | 12V Zener | | |
| D3,4 | 1N4148 | | |
| D5 | 60V Zener | | |

The −130 VDC input and −110 VDC output terminals correspond to the voltage supply terminal 2 and voltage output terminal 10 respectively of FIG. 1 and have been numbered accordingly. Resistor R1 functions as a current sensor, the voltage drop thereacross being applied to amplifier U1 and its associated components to form an output signal on lead 40 indicative of the magnitude of the load current. Resistors R4 and R5, together with associated capacitors C1 and C3 form lag filters to provide frequency compensation and resultant circuit stability. Capacitor C2 alters the rolloff characteristics of the amplifier.

A portion of the output signal on lead 40 is coupled to the input lead 42 of amplifier U2 to establish a maximum load current value. Resistor R8 and capacitor C4 prevent an excess current indication when the system is turned on. Amplifier U2 with its associated resistive elements R9 and R10 provides a comparison of the sensed load current to a reference while introducing hysteresis in the system. The logic signal on its output lead 44 describing the load current is then "anded" with the 5 volt source in logic gate U3 such that the load current must be within the prescribed limit and the 5 volt source must be present to derive a logic signal on lead 46 capable of energizing transistor Q1. If then, the 15 volt source applied to the base of transistor Q2 is up to 12 volts or higher, transistor Q3 will be energized to connect the −130 volt source to the load. If the 15 volt supply is less than 12 volts, transistor Q4 is activated to shunt resistor R17 across filter capacitor C6 to discharge the latter.

The RC filter formed by resistor R18 and capacitor C6 establishes a slow initial build-up of the voltage at the output terminal to "cushion" the load devices during turn-on interval. When the output voltage has reached a high percentage of its nominal value, selected herein as 80 percent thereof, transistor Q5 and Q6 are activated so as to bypass the current limiting resistor R18 such that the output voltage rapidly attains its maximum value.

Although the preferred embodiment of the invention is described in detail above, it is to be understood that various changes, substitutions and alterations can be made therein without departing from the spirit and scope of the invention as defined by the appended claims.

What is claimed is:

1. A load protection circuit interposed between a power source and a load comprising:
   a high voltage input terminal, a high voltage output terminal and a reference terminal,
   current sensing means, voltage risetime control means and output control means serially connected between said high voltage input terminal and said high voltage output terminal,
   a capacitive filter connected between the junction of said voltage risetime control means and said output control means and said reference terminal,
   current comparison and limiter means coupled to said current sensing means for providing a first logic signal when the load current is within a predetermined maximum limit,
   first gating means for providing a second logic signal during the simultaneous presence of said first logic signal and a first low voltage,
   second gating means for providing a third logic signal during the simultaneous presence of said second logic signal and a second low voltage, and
   means for applying said third logic signal to said output control means to activate said output control means whereby said power source is coupled to said load.

2. Apparatus as defined in claim 1 wherein said second low voltage is a predetermined percentage of its nominal value.

3. Apparatus as defined in claim 2 and further comprising:
   output voltage sensor means connected to said high voltage output terminal,
   said output voltage sensor means providing a signal to bypass the serially connected impedance of said voltage risetime control means when the voltage at said high voltage output terminal reaches a predetermined percentage of its nominal value, 4. Apparatus as defined in claim 3 and further comprising:
   discharge circuit means connected across said capacitive filter adapted to discharge said capacitive filter when said second low voltage is less than said predetermined percentage of its nominal value.

5. Apparatus as defined in claim 4 wherein said current comparison and limiter means includes frequency compensation and hysteresis circuitry.

* * * * *